United States Patent Office 2,709,917
Patented June 7, 1955

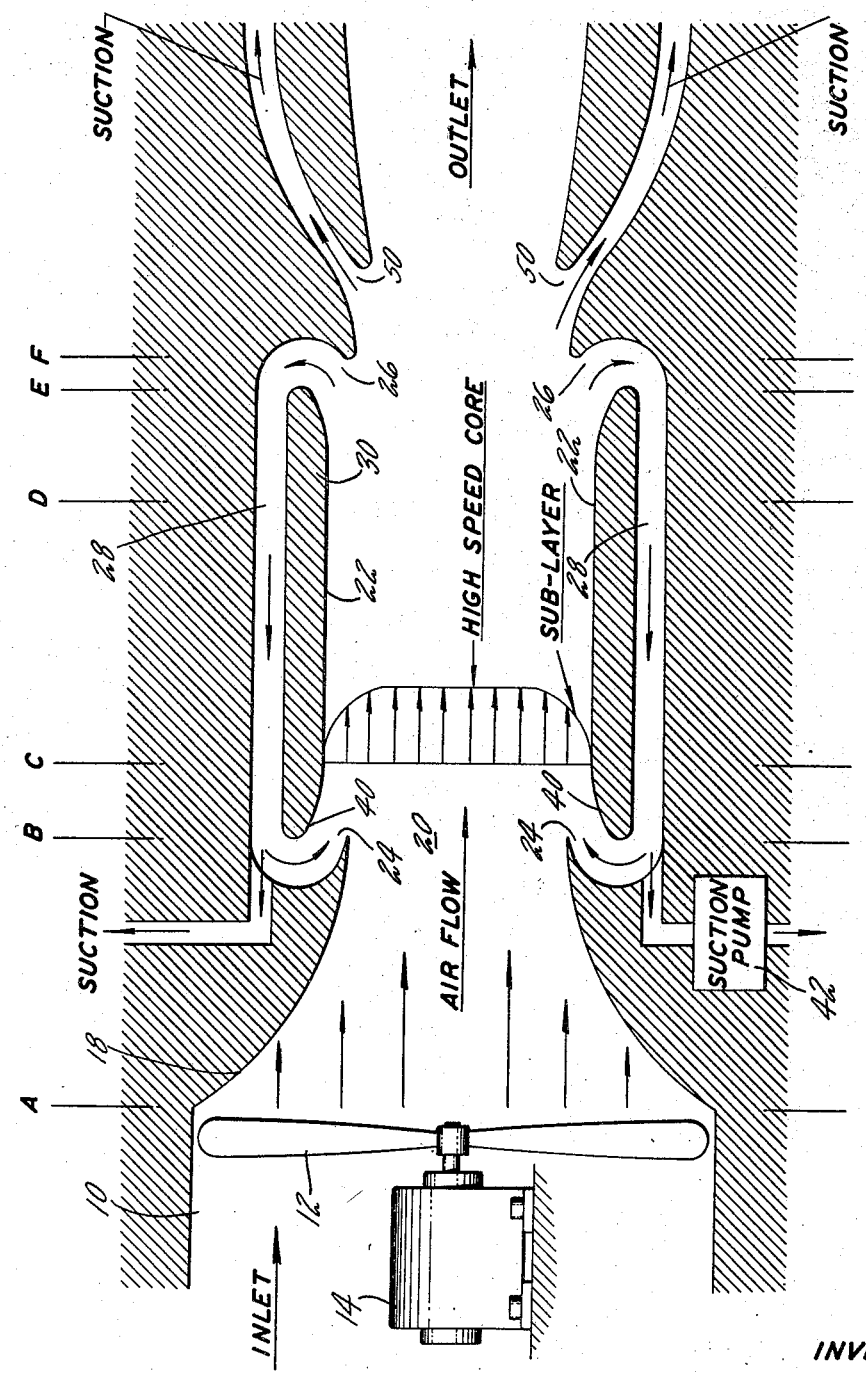

2,709,917

TRANSONIC FLOW CONTROL

Hendrik Bruynes, West Hartford, Conn., assignor to United Aircraft Corporation, East Hartford, Conn., a corporation of Delaware Application February 15, 1952, Serial No. 271,797

8 Claims. (Cl. 73—147)

This invention relates to fluid flow control devices and more particularly to devices and methods for controlling fluid flow at transonic velocities.

Interest in determining the characteristics of fluid flow over bodies at transonic velocities has required substantial test equipment to obtain the desired flow. In order to obtain controlled flow over a range of transonic velocities it has been the usual practice to utilize Laval type nozzles whose walls could be varied in shape so as to produce the desired transonic Mach number in test sections of wind tunnels and the like. Where large wind tunnels and similar test facilities are used considerable equipment is necessary in order to manipulate the walls of Laval type nozzles in order to obtain the desired velocity in the test section.

It is therefore an object of this invention to provide a simple yet efficient device for controlling confined transonic fluid flow.

It is a further object of this invention to provide a device for extending the choking Mach number of a confined stream to permit velocities above Mach number 1 while avoiding sudden deceleration of the fluid by shock in the test section.

A still further object of this invention is to provide a device for controlling a confined fluid stream which comprises means for surrounding the main stream or core with an annular layer of low energy fluid which separates the core from the confining wall to permit the core to expand and accelerate to velocities above Mach number 1 and at the same time maintaining the core free of shock over a predetermined distance along the axis of flow.

These and other objects will become readily apparent from the following detail description of the drawing which illustrates a cross section of a confining duct such as a wind tunnel and the like.

Referring to the drawing, a confining duct 10 is illustrated as having a fan 12 or similar flow accelerating device located therein. The fan 12 may be driven by a motor 14 which obtains its power from a suitable source.

For convenience of description and illustration datum lines or stations designated with the letters A through F are utilized to indicate various points or positions along the axis of fluid flow.

Between the stations A and B the air is accelerated by a subsonic nozzle 18 which has a profile such that the air will accelerate to substantially a Mach number 1 at station B.

It should be pointed out that in order to further accelerate the stream to velocities above Mach number 1 it is necessary that the stream be permitted to expand. This would be the case where an ordinary Laval type nozzle is utilized. Under normal conditions were the stream not allowed to expand the phenomenon of choking would occur such that a shock would occur immediately downstream of station B and hence cause the stream to decelerate in passing through the shock. It is then the purpose of this invention to permit the stream to expand in a downstream direction while maintaining the cross-sectional area of the confining duct substantially constant for a predetermined axial distance as for example in a wind tunnel test section shown herein as being located between stations C and D.

In order to control the main stream so as to permit acceleration to a velocity above Mach number 1 the duct 20 is provided with an enlarged wall portion 22. As mentioned above, the cross-sectional area defined by the wall portion 22 is substantially constant in cross-sectional area between stations C and D. The relationship in the cross-sectional area at stations C and D to the cross-sectional area at station B may be such that the diameter at station B is approximately .7 of the diameter of the duct between stations C and D. The diameter of the duct at station F may be substantially equal to that at station B.

In order to provide for effective expansion of the airstream downstream of station B an annular opening 24 is provided approximately at station B for ejecting an annular layer of low velocity air which moves downstream along the wall 22 and is subsequently removed via an annular opening 26 in the vicinity of stations E and F. The annular openings 24 and 26 are interconnected by a passage or passages 28. The passage 28 may take the shape of an annular passage in which case the confining wall 22 would be formed by a cylindrical member 30. It should be noted that the upstream end 40 of the cylindrical member 30 tapers inwardly toward the axis of duct 20 so as to form a converging path for the air being ejected out of the annular opening 24. The passage 28 may be connected to a suction pump 42 which will remove a portion of the fluid being inducted through the annular opening 26 (station E) while the remainder of the fluid is recirculated and again ejected at relatively low energy out of the annular opening 24.

The annular layer of air being ejected from the opening 24 is illustrated in the drawing as the sub-layer while the arrows of station C indicate the velocity profile across the stream. Because the airstream in the sub-layer is maintained substantially subsonic the convergence occurring in the sub-layer stream between stations B and C (as a result of the convergence of surface 40) corresponds to an accelerating flow condition. Between stations C and D (the test section) the sub-layer and the main stream do not accelerate in a downstream direction and remain at constant velocity. Between stations D and E the fixed surface 22 diverges thus permitting the sub-layer stream to expand and decelerate. The sub-layer is removed at station E (opening) and the main stream enters the diffuser portion at station F. It should be noted that with the sub-layer expanding between stations D and F this contracts the main stream so as to decelerate the flow.

A further annular opening 50 may be provided downstream of station F to permit expansion of the stream so as to insure that any decelerating shock wave occurs well downstream of the test section.

It might be added that a desirable velocity for the sub-layer would be in the order of one-third of that occuring in the high speed core.

As a result of this invention it is apparent that a simple yet highly efficient control means has been provided for obtaining transonic velocities in confined airstreams. For any variations in flow conditions the amount of suction being produced by the pump 42 may be varied if desired.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In a device for controlling the characteristics of a fluid stream, a duct having an axis along, means for flowing a high energy fluid stream along the axis of said duct, said duct having intermediate its ends a wall portion forming a passage of greater cross-sectional area than that of the remainder of the duct, said passage being coaxial with the remainder of said duct, and means for ejecting an annular layer of low energy fluid into the duct adjacent the upstream end of said passage and removing said layer at the downstream end of said passage, said annular layer having an axis of flow common to said duct and being in contact with the high energy stream, and a conduit providing a separate fluid path between the ends of said passage.

2. In a device according to claim 1 including suction mechanism operatively connected to said passage for removing a portion of the fluid from said passage.

3. In a device for controlling the characteristics of a fluid stream to provide transonic velocities, a duct having an axis, means for moving a mass of fluid through said duct and means for obtaining and maintaining transonic velocities within said duct free of shock comprising an enlarged duct portion of larger cross-sectional area than the remainder of the duct having a wall spaced from the duct axis farther than the remainder of the duct and having an axis common to said duct axis, and a member coaxially disposed in said enlarged portion and having inner and outer coaxially disposed walls, said outer wall being spaced inwardly from said first mentioned wall, the inner wall of said member being spaced outwardly from the axis of the duct relative to the remainder of the duct.

4. In a device for controlling the characteristics of a fluid stream to provide transonic velocities, a duct having an axis, means for moving a mass of fluid through said duct, and means for obtaining and maintaining transonic velocities within said duct free of shock comprising an enlarged duct portion of larger cross-sectional area than the remainder of the duct and having a wall spaced from the duct axis farther than the remainder of the duct, said wall surrounding said stream and coaxially disposed relative to said duct, a member coaxially disposed in said enlarged portion and having inner and outer walls, said outer wall being spaced inwardly from said first mentioned wall, the inner wall of said member being spaced outwardly from the axis of the duct relative to the remainder of the duct, said member having a dimension along the duct axis which is smaller than the axial dimension of said enlarged portion, and suction mechanism communicating with the space defined by the wall of said enlarged portion and the outer wall of said member.

5. In a method for controlling a fluid stream of transonic velocity in a confining passage, the steps comprising, moving a main mass of fluid flow through the passage at transonic velocity, and circulating a fluid stream of lower velocity than the main mass with the stream moving parallel to the axis of said main stream and surrounding the main stream, said fluid stream contacting said main mass.

6. In a method for controlling a fluid stream of transonic velocity in a confining passage with the passage having a slightly enlarged portion along a portion of its axis, the steps comprising, moving a main mass of fluid through the passage at transonic velocity, and moving a second mass of flow in the direction of said main fluid flow with the second mass located at said enlarged portion and having a lower Mach number than the main mass at any given station along the axis of flow, said second mass surrounding and contacting said main mass.

7. In a method for controlling a fluid stream to obtain undisturbed low supersonic velocities in a confining passage, the steps comprising, accelerating a main mass of fluid to at least sonic speed for movement through the passage, introducing a low energy secondary tubular mass of fluid in the direction of flow of the main mass with the tubular mass surrounding and contacting the main mass, and maintaining the velocity of the secondary mass flow accelerating in a downstream direction over at least a portion of its path of flow.

8. In a method for controlling a fluid stream to obtain undisturbed low supersonic velocities in a confining passage, the steps comprising, accelerating a main mass of fluid to at least sonic speed for movement through the passage, introducing a secondary tubular mass of fluid flowing in the direction of flow of the main mass with the tubular mass surrounding and contacting the main mass, said secondary mass having a lower Mach number than the main mass at any axial station, and accelerating the secondary mass flow and the main mass in a downstream direction by providing a contracting passage for the combined stream.

References Cited in the file of this patent

UNITED STATES PATENTS

| | | |
|---|---|---|
| 2,365,411 | Jacobsson | Dec. 19, 1944 |
| 2,424,654 | Gamble | July 29, 1947 |
| 2,551,470 | Smith | May 1, 1951 |
| 2,580,228 | Johnson | Dec. 25, 1951 |

FOREIGN PATENTS

| | | |
|---|---|---|
| 792,293 | France | Dec. 26, 1935 |
| 579,758 | Great Britain | Aug. 14, 1946 |
| 438,578 | Italy | Aug. 17, 1948 |
| 619,250 | Great Britain | Mar. 7, 1949 |
| 635,609 | Great Britain | Apr. 12, 1950 |